United States Patent
Breuer et al.

(10) Patent No.: US 8,453,869 B2
(45) Date of Patent: Jun. 4, 2013

(54) PRESSURE VESSEL INCLUDING CERAMIFYING POLYMER FOR IMPROVED HEAT RESISTANCE

(75) Inventors: Patrick Breuer, Montabaur (DE); Markus Lindner, Mainz (DE); Angela Fröhlich, Ingelheim (DE); Martin Brügelmann, Wiesbaden (DE)

(73) Assignee: GM Global Technology Operations LLC, Detroit, MI (US)

( * ) Notice: Subject to any disclaimer, the term of this patent is extended or adjusted under 35 U.S.C. 154(b) by 533 days.

(21) Appl. No.: 12/708,893

(22) Filed: Feb. 19, 2010

(65) Prior Publication Data

US 2011/0204063 A1      Aug. 25, 2011

(51) Int. Cl.
*F17C 1/06*      (2006.01)

(52) U.S. Cl.
USPC ............... 220/590; 220/62.11; 220/62.19; 220/586; 220/62.15

(58) Field of Classification Search
USPC ............... 220/562, 62.11, 62.22, 62.19, 590, 220/560.01, 586, 62.15
See application file for complete search history.

(56) References Cited

U.S. PATENT DOCUMENTS

| | | | |
|---|---|---|---|
| 2,809,762 A * | 10/1957 | Cardona | 220/590 |
| 2009/0057319 A1 | 3/2009 | Schlag | |
| 2009/0152278 A1 | 6/2009 | Lindner | |
| 2009/0286669 A1 * | 11/2009 | Saleh | 501/141 |
| 2009/0305589 A1 * | 12/2009 | Budden et al. | 442/59 |
| 2010/0240811 A1 * | 9/2010 | He et al. | 524/94 |
| 2010/0280145 A1 * | 11/2010 | Heikkila et al. | 523/105 |

* cited by examiner

*Primary Examiner* — Anthony Stashick
*Assistant Examiner* — Jeffrey Allen
(74) *Attorney, Agent, or Firm* — Fraser Clemens Martin & Miller LLC; J. Douglas Miller

(57) ABSTRACT

A vessel for holding a pressurized fluid is disclosed, the vessel having a hollow inner shell formed from a moldable material and forming a cavity therein, an intermediate shell formed over the inner vessel, and an outer shell formed over said intermediate shell, said outer shell having a ceramic layer formed on an outer surface thereof.

17 Claims, 3 Drawing Sheets

PRESSURE VESSEL INCLUDING CERAMIFYING POLYMER FOR IMPROVED HEAT RESISTANCE

FIELD OF THE INVENTION

The invention relates to a vessel and more particularly to a pressure vessel having a hollow inner shell formed from a moldable material, an intermediate shell formed over the inner shell, and an outer shell formed over the intermediate shell, the outer shell impregnated with a ceramifying material adapted to form a ceramic layer around the outer layer when exposed to thermal energy.

BACKGROUND OF THE INVENTION

Fuel cells have been proposed as a power source for electric vehicles and other applications. In proton exchange membrane (PEM) type fuel cells, hydrogen is supplied as a fuel to an anode of the fuel cell and oxygen is supplied as an oxidant to a cathode of the fuel cell. A plurality of fuel cells is stacked together in a fuel cell stack to form a fuel cell system. The fuel and oxidant are typically stored in pressurized hollow vessels such as fuel tanks, for example, disposed on an undercarriage of the vehicle.

A typical pressurized vessel 10 is illustrated in FIGS. 1a, 1b, and 2. The vessel 10 includes three shells: an inner shell 12, an intermediate shell 14 formed over the inner shell 12, and an outer shell 16 formed over the intermediate shell 14. The inner shell 12 is typically formed from a polymeric material such as polyethylene, PET, ethylene vinyl alcohol, or an ethylene vinyl acetate terpolymer. The inner shell 12 may also be formed from any moldable material such as a metal, a glass, and the like. The intermediate shell 14 is typically formed by a filament winding process from one of a carbon fiber and a carbon fiber composite and provides structural strength to the vessel 10. The outer shell 16 is typically formed from a glass fiber wound around the intermediate shell 14. The outer shell 16 is typically impregnated with an epoxy or other suitable adhesive to facilitate adhesion of the outer shell 16 with the intermediate shell 14.

The inner shell 12 of the vessel 10 is typically formed over an exterior portion of, or on an interior portion of, a finish facilitating fluid communication with an interior of the vessel 10. In FIG. 1a, the finish is a metallic boss 18. The metallic boss 18 is in communication with a valve 20, but the metallic boss 18 may be in communication with any means for fluid communication (not shown) with other vessel fittings such as a pressure relief device, a nozzle, a conduit, and the like.

To minimize the effects of thermal energy on the inner shell(s) of typical vessels, a metal shell is formed around the outer shell of the vessel. Formation of such metal shells is labor intensive, increases weight, and maximizes both the assembly and material costs of the vessels.

It would be desirable to develop a hollow pressure vessel adapted to minimize the effect of thermal energy on the vessel, while also minimizing the assembly and material costs thereof.

SUMMARY OF THE INVENTION

Concordant and congruous with the present invention, a hollow pressure vessel adapted to minimize the effect of thermal energy on the vessel, while also minimizing the assembly and material costs thereof, has surprisingly been discovered.

In one embodiment, a vessel comprises an inner shell formed from a moldable material and forming a cavity therein; an intermediate shell formed over said inner shell; and an outer shell formed over said intermediate shell, said outer shell impregnated with a ceramifying material.

In another embodiment, a vessel comprises an inner shell formed from a moldable material and forming a cavity therein; an intermediate shell formed from a carbon fiber formed over said inner shell; and an outer shell formed from a glass fiber impregnated with a ceramifying material, wherein the ceramifying material is adapted to form a ceramic layer around said outer shell when exposed to thermal energy.

In another embodiment, a vessel comprises a hollow inner shell formed from a moldable material and forming a cavity therein; a first shell; a second shell formed between said first shell and said outer shell; and a ceramic shell formed over and penetrating into said first shell, said ceramic shell formed from a ceramifying material impregnated in the material of said first shell, wherein said ceramifying material forms said ceramic shell when exposed to thermal energy.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 1b is an enlarged fragmentary cross-sectional view of the vessel of highlighted by circle b in FIG. 1a;

FIG. 2 is a cross-sectional end elevational view of the vessel of FIG. 1a;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

Figure 1A:
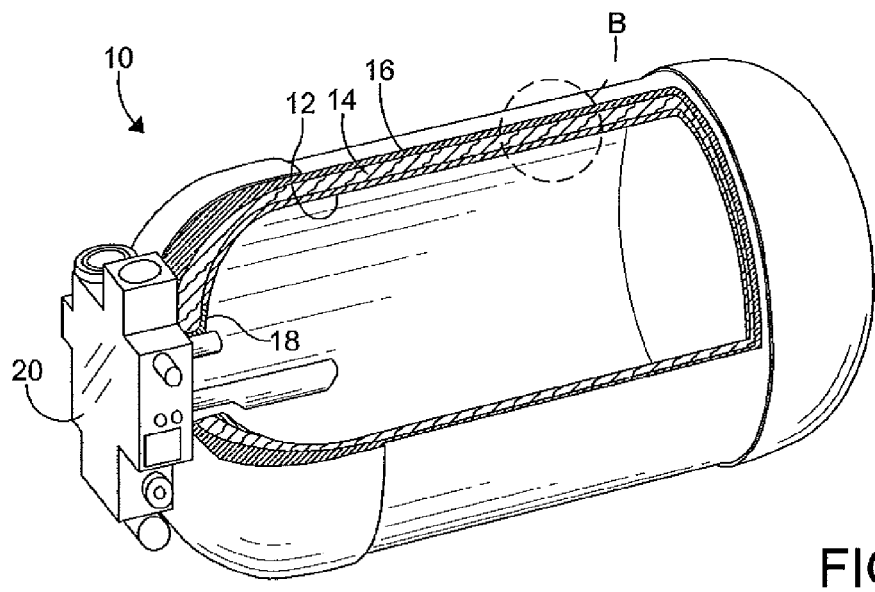
FIG. 1a is a perspective view of a vessel partially in section as known in the art.
Figure 1B:
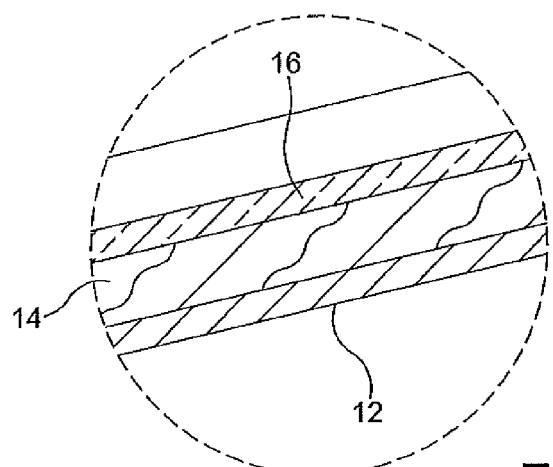
Figure 2:
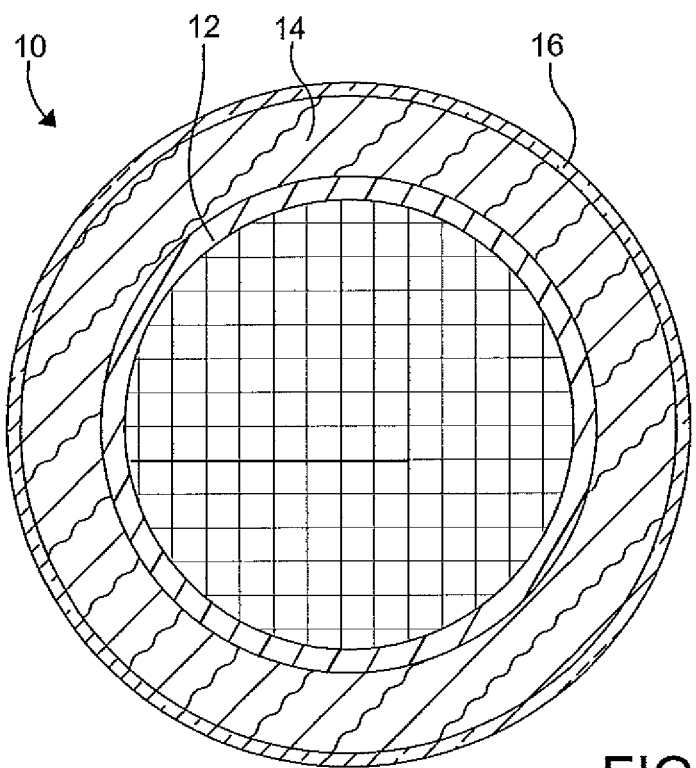
Figure 3:
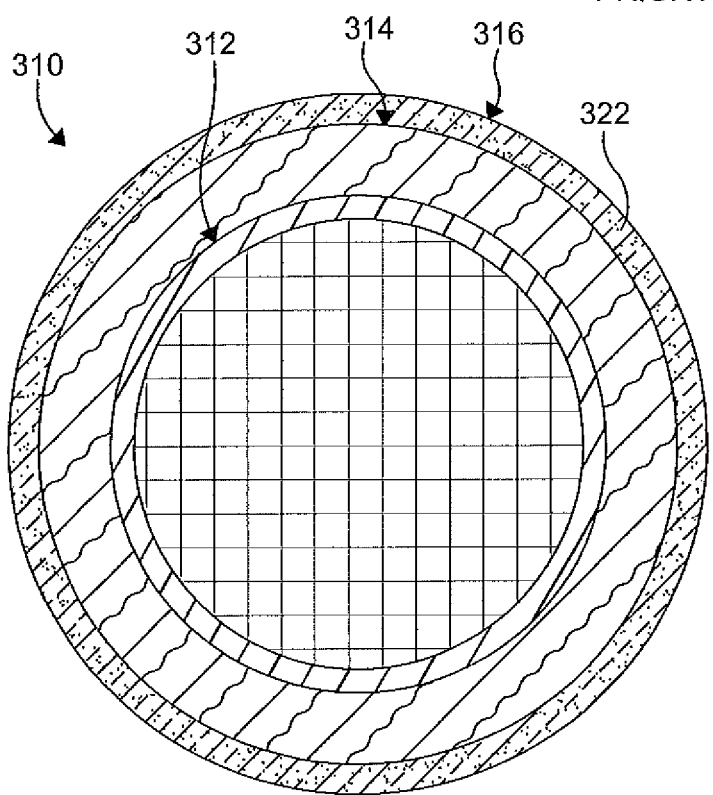
FIG. 3 is a cross-sectional end elevational view of a vessel according to an embodiment of the invention.
Figure 4:
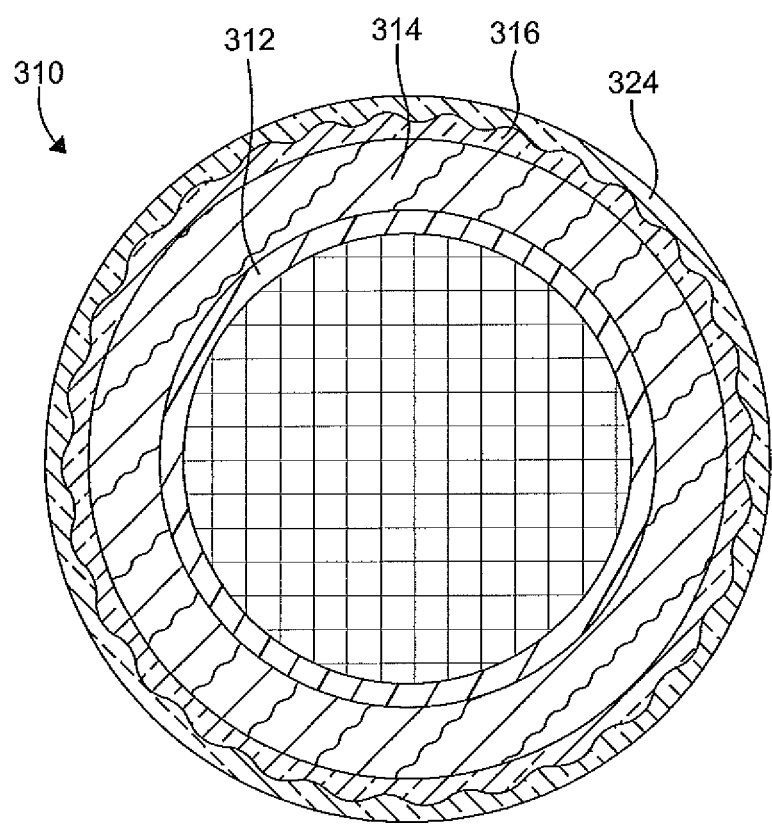
FIG. 4 is a cross-sectional end elevational view of the vessel of FIG. 3 subsequent to exposure to thermal energy.

FIGS. 3 and 4 illustrate a hollow pressure vessel 310 having an inner shell 312, an intermediate shell 314, and an outer shell 316. Like the vessel 10 illustrated in FIGS. 1a, 1b, and 2, the vessel 310 has a substantially cylindrical shape and is adapted to hold a pressurized fluid (not shown). It is understood that the vessel 310 may have any shape as desired, and the vessel 310 may include additional layers such as a barrier layer, a foil layer, a porous permeation layer, and the like, as desired, similar to those disclosed in commonly-owned U.S. patent application Ser. No. 11/847,007 and U.S. patent application Ser. No. 11/956,863 hereby incorporated herein by reference in their entireties. The pressurized fluid may be any fluid such as hydrogen gas and oxygen gas, a liquid, and both a liquid and a gas, for example.

The inner shell 312 of the vessel 310 is a hollow container adapted to store the pressurized fluid. As shown, the inner shell 312 is formed from a layer of polymer material, but the inner shell 312 may be formed from multiple layers, as desired. The inner shell 312 may be formed by blow molding, extrusion blow molding, rotational molding, or any other suitable process. In the embodiment shown, the inner shell 312 has a substantially cylindrical shape. However, the inner shell 312 may have any shape, as desired. Like the vessel 10, a first end (not shown) of the inner shell 312 can receive at least a portion of a boss (not shown). The inner shell 312 may be formed from a plastic such as polyethylene, PET, ethylene vinyl alcohol, or an ethylene vinyl acetate terpolymer. The inner shell 312 may also be formed from other moldable materials such as a metal, a glass, and the like.

The intermediate shell 314 of the vessel 310 is disposed on the inner shell 312 between the inner shell 312 and the outer shell 316. The intermediate shell 314 has a substantially cylindrical shape. As shown, the intermediate shell 314 substantially abuts the inner shell 312. The intermediate shell 314 may be formed from any moldable material such as a metal and a plastic, for example, or the intermediate shell 314 may be formed with a filament winding process. If the intermediate shell 314 is formed by a filament winding process, the intermediate shell 314 may be formed from a carbon fiber, a glass fiber, a composite fiber, a fiber having a resin coating, and the like, for example. It is understood that the material used to form the intermediate shell 314 may be selected based on the process used to affix the intermediate shell 314 to the inner shell 312, the use of the vessel 310, and the properties of the fluid to be stored in the vessel 310.

The outer shell 316 of the vessel 310 is disposed over at least a portion of the intermediate shell 314. The outer shell 316 has a substantially cylindrical shape. As shown in FIGS. 3 and 4, the outer shell 316 substantially abuts the intermediate shell 314. The outer shell 316 is formed from glass fiber impregnated or otherwise coated with a ceramifying material 322 with a filament winding process. Because of the ceramifying material 322, the outer shell 316 has a thickness greater than the glass fiber outer shell of a typical vessel, such as the outer shell 16 of the vessel 10. The outer shell 316 is also impregnated with an epoxy to facilitate bonding of the outer shell 316 with the intermediate shell 314. It is understood that the outer shell 316 may be formed from a carbon fiber, a composite fiber, a fiber having a resin coating, and any other material adapted to be filament wound. Additional ceramifying material 322 may be disposed on a surface of the outer shell 316 by a spraying process, a coating process, a dipping process, and any other process adapted to fill void space between the fibers of the outer shell 316 with the ceramifying material 322.

The ceramifying material 322 is a compound including a matrix, at least one refractory mineral, and a flux. The ceramifying material 322 may selectively also include a functional additive. In the embodiment shown in FIG. 3, the matrix is a polymeric material such as a polyester, an acrylonitrile acid ester, a vinyl chloride, a polyolefin, a polyamide, derivatives of the foregoing, blends of the foregoing, and copolymers of the foregoing, for example. The matrix may also be a rubber, such as an ethylene-propylene diene (EPDM) rubber. The refractory mineral may be one of a ceramic forming precursor and a ceramic, such as a silicate mineral. The silicate mineral may be a clay or a talc. The flux may be any material used to lower the melting point of the refractory material. The flux may be lead, boric, soda, potassium, lithium, calcium, magnesium, barium, zinc, strontium, and compounds including any of the foregoing, such as lead bisilicate. The flux may also be a feldspar such as a potash feldspar and a soda feldspar.

The functional additive may be one of a flame retardant, a smoke suppressant, a foaming agent, a colorant, and a combination of the foregoing.

In use, the vessel 310 is coupled to a fuel-cell powered vehicle. It is understood that vessel 310 may be coupled to a vehicle powered by any means. When the vessel 310 is under ordinary operating conditions and in ambient temperatures, the vessel 310 as described above. However, when the vessel 310 is exposed to thermal energy having a temperature from about 150 degrees Celsius to about 300 degrees Celsius, the polymer matrix degrades. As the polymer matrix degrades and when the vessel 310 is exposed to thermal energy from about 300 degrees Celsius and about 1000 degrees Celsius, the refractory mineral enters a liquid phase and forms a porous ceramic shell 324, a process known as ceramification, as shown in FIG. 4. Ceramification involves the bonding or fusing of the refractory mineral particles in the liquid phase, as well as reaction sintering of the particles of the refractory minerals. The refractory mineral is chosen such that the ceramic formed does not undergo shrinkage when exposed to thermal energy having a temperature from about 750 degrees Celsius and about 1000 degrees Celsius. The melting point of the refractory mineral is lowered by the flux material to facilitate formation of the ceramic shell 324. The flux and the refractory mineral, as well as the amounts of each used, are selected based on the properties of each to ensure that the liquid phase refractory material has a desired viscosity and does not flow from the void space in the outer shell 316 upon exposure to thermal energy from about 300 degrees Celsius and about 1000 degrees Celsius. As a result of exposure of the vessel 310 to thermal energy, the ceramic shell 324 is formed both around the outer shell 316 and the ceramic shell 324 penetrates into the outer shell 316. The ceramic shell 324 is adapted to minimize thermal energy exposure to the intermediate shell 314 and the inner shell 312 of the vessel 310.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:
1. A pressure vessel comprising:
an inner shell formed from a moldable material and forming a cavity therein;
an intermediate shell formed over said inner shell; and
an outer shell formed over said intermediate shell, said outer shell having windings defining a void space impregnated with a ceramifying material, the ceramifying material including a matrix, at least one refractory mineral, and a flux, the matrix configured to hold the ceramifying material within the void space during ordinary operating conditions of the pressure vessel and degrade when the outer shell reaches a first temperature associated with exposure of the pressure vessel to thermal energy different from the ordinary operation conditions, the at least one refractory mineral configured to ceramify by one of entering a liquid phase and sintering to form a ceramic layer around said outer shell when said outer shell reaches a second temperature associated with exposure of the pressure vessel to thermal energy different from the ordinary operation conditions, the flux configured to lower a melting point of the at least one refractory mineral to the second temperature, the at least one refractory material and the flux further selected to ensure that the at least one refractory material in the liquid phase has a viscosity that militates against a flowing of the at least one refractory material from the void space in the outer shell upon the outer shell reaching the second temperature.

2. The pressure vessel of claim 1, wherein the first temperature at which the matrix degrades is in a range from about 150 degrees Celsius to about 300 degrees Celsius, and the second temperature at which the at least one refractory material ceramifies in a range from about 300 degrees Celsius to about 1000 degrees Celsius.

3. The pressure vessel of claim 1, wherein the ceramic layer penetrates into said outer shell.

4. The pressure vessel of claim 3, wherein the ceramic layer adheres said outer shell to said intermediate shell.

5. The pressure vessel of claim 1, wherein the ceramifying material includes a polymer, at least one refractory mineral, and a flux.

6. The pressure vessel of claim 5, wherein the ceramifying material further includes a functional additive.

7. The pressure vessel of claim 6, wherein the functional additive is one of a flame retardant, a smoke suppressant, a foaming agent, a colorant, and a combination of the foregoing.

8. The pressure vessel of claim 5, wherein the matrix is a polymer including at least one of a ethylene-propylene diene rubber, a polyester, an acrylonitrile acid ester, a vinyl chloride, a polyolefin, a polyamide, derivatives of the foregoing, blends of the foregoing, and copolymers of the foregoing.

9. The pressure vessel of claim 5, wherein the refractory mineral is one of a ceramic forming precursor and a ceramic.

10. The pressure vessel of claim 5, wherein the refractory mineral is a silicate mineral.

11. The pressure vessel of claim 10, wherein the silicate mineral is one of a clay and a talc.

12. The pressure vessel of claim 5, wherein the flux includes one of lead, boric, soda, potassium, lithium, calcium, magnesium, barium, zinc, strontium, and a feldspar.

13. The pressure vessel of claim 12, wherein the feldspar is one of a potash feldspar and a soda feldspar.

14. The pressure vessel of claim 1, wherein said intermediate shell is formed from a carbon fiber.

15. The pressure vessel of claim 1, wherein said outer layer is formed from a glass fiber.

16. A pressure vessel comprising:
an inner shell formed from a moldable material and forming a cavity therein;
an intermediate shell formed from a carbon fiber formed over and abutting said inner shell; and
an outer shell formed over and abutting said intermediate shell, and formed from a glass fiber defining a void space impregnated with a ceramifying material, the ceramifying material including a matrix, at least one refractory mineral, and a flux, the matrix configured to hold the ceramifying material within the void space during ordinary operating conditions of the pressure vessel and degrade when the outer shell reaches a first temperature associated with exposure of the pressure vessel to thermal energy different from the ordinary operation conditions, the at least one refractory mineral configured to ceramify by one of entering a liquid phase and sintering to form a ceramic layer around said outer shell when said outer shell reaches a second temperature associated with exposure of the pressure vessel to thermal energy different from the ordinary operation conditions, the flux configured to lower a melting point of the at least one refractory mineral to the second temperature, the at least one refractory material and the flux further selected to ensure that the at least one refractory material in the liquid phase has a viscosity that militates against a flowing of the at least one refractory material from the void space in the outer shell upon the outer shell reaching the second temperature.

17. A pressure vessel comprising:
a hollow inner shell formed from a moldable material and forming a cavity therein;
an outer shell;
an intermediate shell formed between said outer shell and said inner shell; and
a ceramic shell formed over and penetrating into a void space defined by windings forming said outer shell, said ceramic shell formed from a ceramifying material impregnated in the void space of said outer shell, the ceramifying material including a matrix, at least one refractory mineral, and a flux, the matrix configured to hold the ceramifying material within the void space during ordinary operating conditions of the pressure vessel and degrade when the outer shell reaches a first temperature associated with exposure of the pressure vessel to thermal energy different from the ordinary operation conditions, the at least one refractory mineral configured to ceramify by one of entering a liquid phase and sintering to form a ceramic layer around said outer shell when said outer shell reaches a second temperature associated with exposure of the pressure vessel to thermal energy different from the ordinary operation conditions, the flux configured to lower a melting point of the at least one refractory mineral to the second temperature, the at least one refractory material and the flux further selected to ensure that the at least one refractory material in the liquid phase has a viscosity that militates against a flowing of the at least one refractory material from the void space in the outer shell upon the outer shell reaching the second temperature.

* * * * *